United States Patent [19]
Herbert

[11] Patent Number: 5,923,523
[45] Date of Patent: Jul. 13, 1999

[54] HIGH CURRENT, LOW INDUCTANCE CAPACITOR PACKAGES

[76] Inventor: Edward Herbert, 1 Dyer Cemetery Rd., Canton, Conn. 06019-2029

[21] Appl. No.: 08/840,424

[22] Filed: Apr. 29, 1997

Related U.S. Application Data

[60] Provisional application No. 60/016,550, Apr. 30, 1996.
[51] Int. Cl.⁶ ................................................ H01G 4/228
[52] U.S. Cl. ................................. 361/306.1; 361/308.1; 361/309; 361/329
[58] Field of Search ............................ 361/306.2, 306.3, 361/386.1, 308.1, 309, 310, 320, 321.2, 232, 298.4, 299.2, 805, 734, 502, 509, 303; 333/181, 182–185; 174/52.4, 72 B, 71 B, 68.2, 88 B

[56] References Cited

U.S. PATENT DOCUMENTS

| | | | |
|---|---|---|---|
| 3,611,051 | 10/1971 | Puppolo | 361/531 |
| 3,617,830 | 11/1971 | Perna | 361/329 |
| 3,638,147 | 1/1972 | Denes | 333/182 |
| 4,734,819 | 3/1988 | Hernandez et al. | 361/306 |
| 4,916,576 | 4/1990 | Herbert et al. | 361/734 |
| 5,057,648 | 10/1991 | Blough et al. | 174/52.4 |
| 5,621,607 | 4/1997 | Farahmandi et al. | 361/502 |
| 5,659,455 | 8/1997 | Herbert | 361/306.1 |

*Primary Examiner*—Kristine Kincaid
*Assistant Examiner*—Anthony Dinkins

[57] ABSTRACT

A four terminal capacitor package has portions of the DC current bus and the DC current return bus of a power supply integrated within it, directly bonded to stick capacitor elements, to provide a very low impedance for noise between the DC current and its return. In some of the packages multiple capacitor elements are used to reduce the inductance of the AC shunt path by providing multiple parallel paths. In other embodiments of the invention the arrangement of the stick capacitors in relationship to each other and the DC buses further reduces AC noise by field separation, cancellation or absorption. The heavy buses and terminations also provide very good heat sinking for the stick capacitors, which allows them to carry larger currents.

13 Claims, 6 Drawing Sheets

Prior art:

Fig. 1

Prior art:

Fig. 2

Prior art:

Fig. 3

Prior art:

HIGH CURRENT, LOW INDUCTANCE CAPACITOR PACKAGES

This is a continuation in part application of a provisional application for patent, Ser. No. 60/016,550 filed Apr. 30, 1996.

Reference is made to U.S. Pat. No. 4,916,576, MATRIX CAPACITOR.

BACKGROUND OF THE INVENTION

Modern low voltage, high current power supplies require capacitors which have very low equivalent series inductance (ESL) and equivalent series resistance (ESR). It is not uncommon in a switched mode power supply to have unwanted high frequency noise superimposed on the desired output voltage and current. A usual arrangement is to filter the output using inductances in series with the output and capacitors shunting the output. Since a capacitor presents a low impedance to high frequency voltages, the noise is attenuated. Unfortunately, the parasitic impedances of available capacitors limits their effectiveness.

While this invention was made with the switched-mode power supply industry in mind, it will be applicable wherever capacitors are needed which can carry very high currents with very low inductance, particularly in a direct current circuit in which the capacitor is a high frequency bypass element.

BRIEF DESCRIPTION OF THE FIGURES

Prior Art

DESCRIPTION OF THE PREFERRED EMBODIMENT OF THE INVENTION

Figure 1:
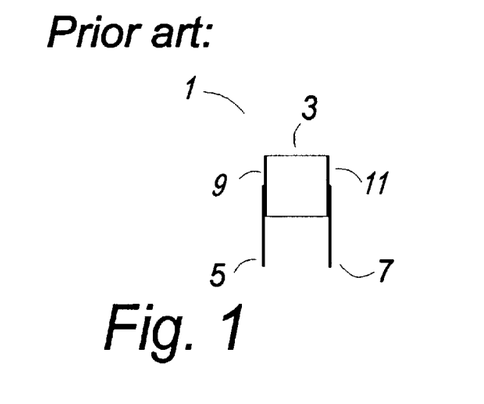
FIG. 1 shows a capacitor of present technology.

FIG. 1 shows a capacitor 1 of present technology. A capacitor element 3 has leads 5 and 7 attached to metalized ends 9 and 11 respectively. The capacitor element 3 may be made in a number of techniques of a number of materials, as is well known in the art, for example, as an illustration not a limitation, the capacitor element 3 may be a stacked film capacitor element.

Figure 2:
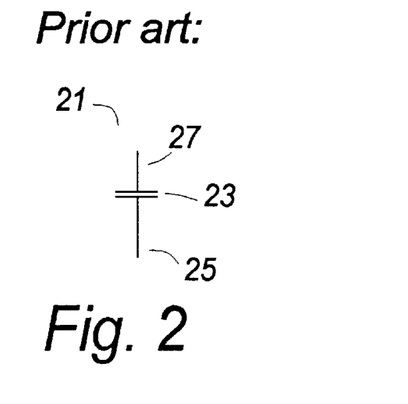
FIG. 2 shows the familiar schematic representation of a capacitor.

FIG. 2 shows the familiar schematic representation of a capacitor 21 having a capacitor element 23 and leads 25 and 27.

Figure 3:
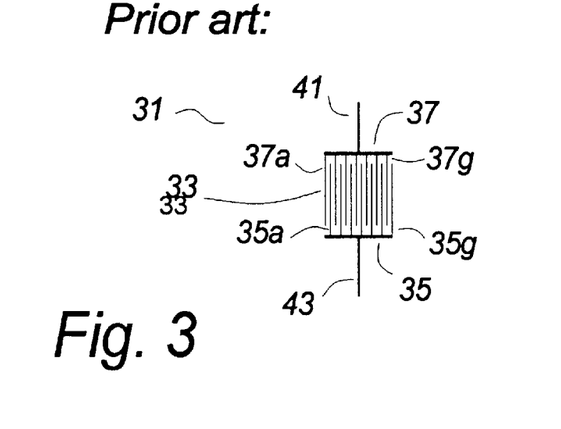
FIG. 3 shows a simplified diagram of the construction of a capacitor of present technology.

FIG. 3 shows a diagrammatic representation of a capacitor 31 having a capacitor element 33 comprising first capacitor electrodes 37a–g and second capacitor electrodes 35a–g. The first capacitor electrodes 37a–g terminate on a first metalized surface 37, and thence to a first lead 41. The second capacitor electrodes 35a–g terminate on a second metalized surface 35, and thence to a second lead 43, as is well known in the art. The first capacitor electrodes 37a–g are separated from the second capacitor electrodes 35a–g by an insulating medium, not shown as it is well understood in the art and it is not a point of novelty of the invention. In practice, most capacitors have a very large number of electrode sheets which are very thin, impossible to draw to scale.

Figure 4:
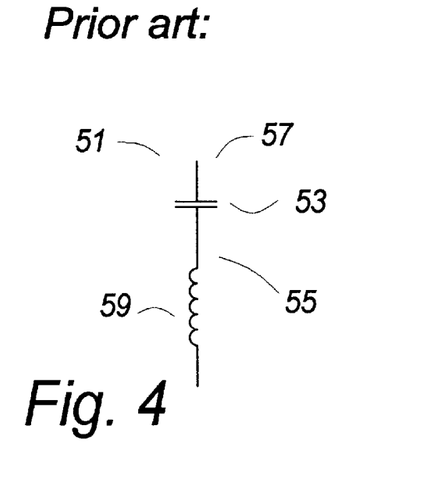
FIG. 4 shows a schematic of a capacitor showing that a "real" capacitor has "lead inductance".

FIG. 4 shows a schematic of a "real" capacitor 51, as contrasted to the "ideal" capacitor 21 of FIG. 2. An ideal capacitor element 53 has leads 55 and 57. There is an unavoidable parasitic inductance associated with the capacitor and its leads, frequently shown as a lumped inductor element 59. It is understood that lumped inductor element 59 actually represents a distributed parasitic inductance. Some of the parasitic inductance 59 is attributed to the wire leads themselves, but some if the inductance is a consequence of the circuit layout.

As is well known, straight wire has an inductance that is a function of its length. Other less well recognized influences are its size, its geometry, and its position in space relative to other conductors. A wide, flat conductor has a lower inductance than a round wire of the same area. A conductor in which a flowing current can "couple" to another circuit having a low impedance will have a lower apparent inductance than a similar conductor which is isolated in space. A loop or coil will have a much higher inductance than a straight wire.

In schematic diagrams herein, lower case italics ($I$, $v$) are used to denote an AC current or voltage, whereas upper case straight letters (i, v) denote a DC current or voltage.

Figure 5:
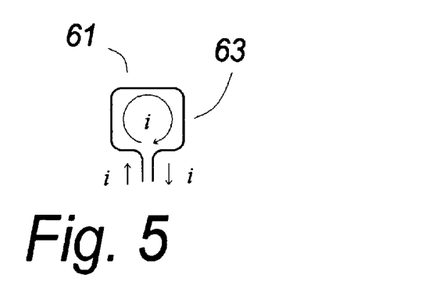
FIG. 5 shows a current-carrying loop, to further illustrate inductance.

FIG. 5 shows a circuit 61 comprising a wire 63 carrying a current $i$. The circuit 61 encloses a loop, so it will have an inductance which can be calculated from first principles, or measured. If the loop is tighter, the inductance will be smaller.

Figure 6:
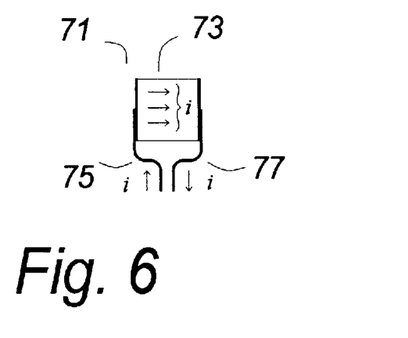
FIG. 6 shows a current-carrying loop in which part of the loop is a capacitor.

FIG. 6 shows a capacitor 71 having a capacitor element 73 and leads 75 and 77. Note that the current $i$ follows a path quite similar to the circuit 61 of FIG. 5, the difference being that within the capacitor element 73 the current $i$ will spread out. The parasitic inductance is attributable partly to the inductance of the wire leads 75 and 77, and partly to the loop enclosed by the current $i$. If the loop is made tighter, as by laying the wires closer to the capacitor element 73 and closer to each other, the parasitic inductance will be smaller.

FIGS. 7 through 10 show the well known discoidal capacitor 81. A capacitor element 83 had two electrodes, one of which terminates on the central wire 85–85, and the other of which terminates on an outer metalized surface 87.

Figure 7:
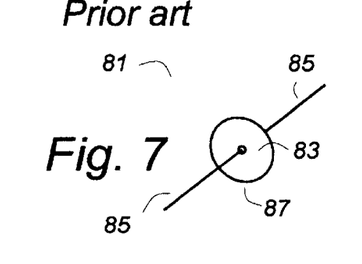
FIGS. 7 through 10 show the "discoidal" capacitor of present technology.
Figure 8:
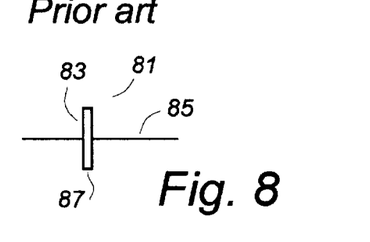

FIG. 8 is a side view of the capacitor 81 of FIG. 7.

Figure 9:
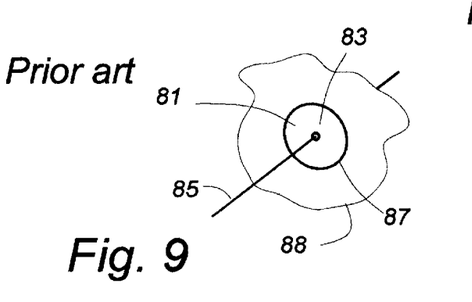

FIG. 9 shows that the discoidal capacitor 81 of FIG. 7 is sometimes mounted in a metal surface 88, as a "feed through" capacitor.

Figure 10:
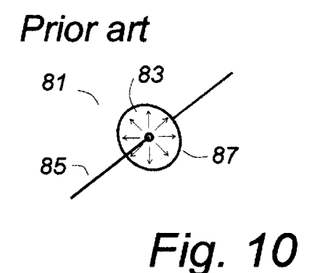

Discoidal capacitors have very good high frequency characteristics. Any inductance associated with the lead 85 is in series with the current flow as well as the bypass ac currents. Also, as shown in FIG. 10, the bypass ac currents are distributed radially, equally in all directions in the plane of the discoidal capacitor element 83. This causes a net cancellation of any far field induced by the bypass ac currents, resulting in a lower parasitic inductance.

Figure 11:
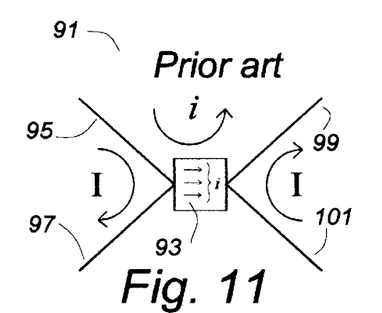
FIG. 11 shows a "four-terminal" capacitor.

FIG. 11 shows a four leaded capacitor 91. A capacitor element 93 is terminated on one side by two leads 95 and 97, and on the other side by two leads 99 and 101. (Three leaded variants are also known).

Figure 12:
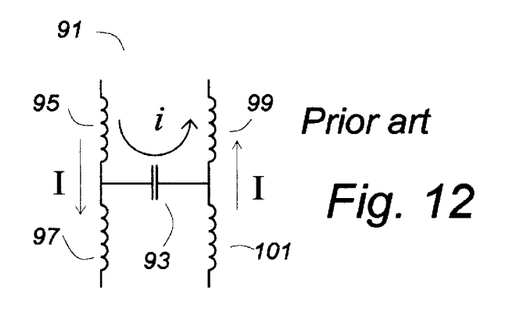
FIGS. 12 and 13 show the parasitic inductances present in a four-terminal capacitor.

These four leaded capacitors are often drawn schematically as in FIG. 12, to illustrate that the parasitic inductances in the leads 95, 97, 99 and 101 are in series with the DC current I, but not in series with the capacitor element 93. As an illustration, not a limitation, a source of DC power having high frequency AC noise may be connected to leads 95 and 99, with the load connected to leads 97 and 101. In theory, any AC noise will be shunted from lead 95 to lead 99 through the capacitor element 93, so that the noise does not appear at the load. This theory holds that the capacitor element has no separate leads, and therefor has no "lead inductance" in the bypass path. This is true, to an extent, but does not account for the inductance due to the loop that the ac current $i$ must follow through lead 95, the capacitor element 93 and the lead 99.

Figure 13:
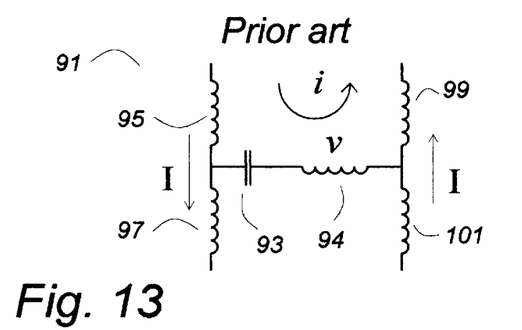

A more complete schematic of a practical four leaded capacitor 91 is as shown in FIG. 13, with a parasitic inductance 94 in series with the capacitor element 93 as well. This parasitic inductance 94 is not located in an explicit point, as the schematic might imply, but is a part of the distributed lumped parasitic inductance of the circuit as a whole, specifically, the inductance seen by the AC current $i$, but not by the DC current I.

Applying well known principles of network analysis, to the extent that the parasitic inductance 94 is common to both sides of the capacitor 91, a voltage drop $v_s$ on the source side caused by current flowing in an impedance will be a voltage source $v_o$ on the output side. Thus any AC current flow through the parasitic inductance 94 will cause a voltage to appear between wires 97 and 101, which is the load side.

The noise attenuation is often quite good, since even poorly designed capacitor circuitss have a relatively low AC impedance, and the on-going circuits typically has significant inductance. But it is increasingly common to use low voltages in critical circuits and often the AC noise currents are quite high, placing ever increasing demands on the filters.

The noise voltage on the load side will be reduced if the parasitic impedance is reduced. Because the parasitic inductance (ESL) is the principle problem, techniques that reduce the inductance of the AC bypass path will be helpful. These may also increase the impedance in the path followed by the DC, which is also helpfiul. Inductance is reduced if a conductor is short and wide. Inductance is also reduced if there are multiple paths, as inductors in parallel have a lower inductance, in general.

In addition, with further reference to FIG. 13, there is a loop on the source side comprising at least the leads 95 and 99 and the capacitor element 93. For very high frequencies, this loop comprises an antenna. Alternatively, it can be thought of as comprising the primary of an air core transformer. This loop will couple potential into nearby loops by virtue of any coupled flux paths. One such loop comprises the leads 97 and 101 and the capacitor element 93, so an AC potential is coupled to the output, exactly what is not wanted in a filter application.

This coupling can be reduced if flux originating in an input loop does not couple any loops on the output side. Several techniques can be used, individually or in combination.

If an output loop is far away from any input loop, coupling will be less. Interposed shielding can block fluxes. If the flux is parallel to the plane of a a loop, so no flux goes through the loop, no voltage can be induced.

If the AC current can be divided so that each half flows in the opposite direction, any field generated by the current will tend to be canceled, so a nearby loop will have less induced noise voltage.

If a flux impinges on the plane of a sheet of conducting material, any induced voltage will circulate within the material and the energy will be dissipated as eddy currents. Therefore, to the extent possible, it is desirable that the AC current flow be parallel to the plane of the DC conductors but at right angles to the direction of the DC current flow, so that any flux from the AC current will impinge normal to a flat surface of the DC circuit conductors. Thus the AC flux cannot induce a voltage in the output circuit, and its energy will be dissipated as an eddy current. In many instances it is preferable to absorb energy from an AC current. A very low bypass impedance can become an element of a resonant circuit, leading to oscillations. Eddy current losses can provide a dampening or snubbing function.

Figure 14:
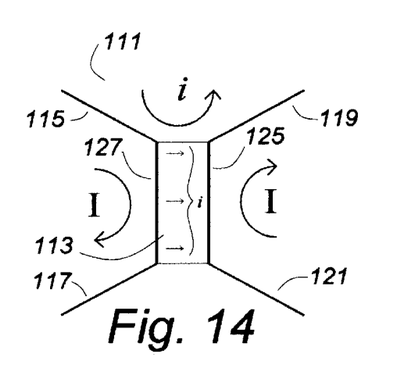
FIG. 14 shows an alternate lead connection for a four-terminal capacitor.

The four leaded capacitor 111 of FIG. 14 shows an improvement over the capacitor 91 of FIG. 11 in that by attaching the leads 115, 117, 119 and 121 to the comers of the capacitor element 113, the DC current I is made to travel along the length of the metalized surfaces 125 and 127 of the capacitor element 113. This imposes an additional impedance to the DC current I which is only partly in series with the AC current $i$. The series parasitic inductance is reduced because the AC conduction path is wide and short. A problem with this construction is that the current carying capacity of the DC circuit along the metalized surfaces 125 and 127 is limited.

Figure 15:
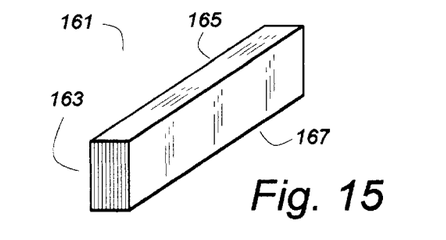
FIG. 15 shows a "Capstick"®, a multi-layer plastic capacitor.

FIG. 15 shows a capacitor 161 having a capacitor element 163 and top and bottom metalized surfaces 165 and 167 respectively which could be a "stick" capacitor. Although capacitor elements of any number of designs could be fabricated with suitable geometry, the stacked film metalized plastic, or "multi-layer plastic" (MLP) capacitor is often fabricated in long sticks. The "stick" capacitor is commercially available, for instance the "Capstick"® made by ITW Paktron. The capacitor element 163 comprises a large number of metalized dielectric layers which have been bonded together so the whole is partially fused into a solid structure. In use, the electrode terminations are metalized surfaces 165 and 167. These stick capacitors are made in long lengths which are then cut into short pieces to make component capacitors of desired ratings.

For example, as an illustration, not a limitation, the "Cap Stick"® made by ITW Paktron is available in lengths up to about 40 Cm. Other manufacturers fabricate MLP capacitors in much longer lengths, several meters or more. Almost always these stick capacitors are then cut into small lengths, a couple of centimeters, more or less, for sale as component capacitors.

MLP capacitors are good for bypass applications because they have very low ESR. Long, slender bypass capacitors are favored in this invention because the DC conduction as shown in FIG. 14 is along the long length and the AC conduction is across a relatively short length but a very wide one, from the perspective of the AC conduction path.

Often the metalized surfaces of the stick capacitors is aluminum, which is not readily solderable. However, aluminum has a comparable thermal expansion to that of copper, so a stick capacitor with aluminum metalization will be thermally compatible with copper in a fabricated assembly. Because of the recent interest in components which can be sirface mounted by reflow soldering, capacitor sticks with solderable metalization are now widely available. Sometimes this is achieved by using a solder or babbit as the metalization, but in other processes it is a second metalization layer applied over a base of aluminum metalization.

Figure 16:
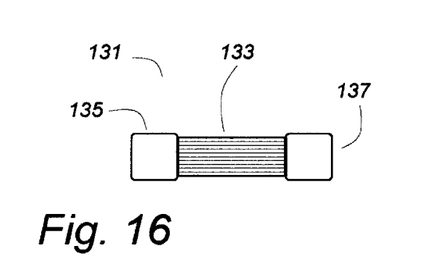
FIGS. 16 and 17 show an improved four-terminal capacitor having very heavy terminal conductors.
Figure 17:
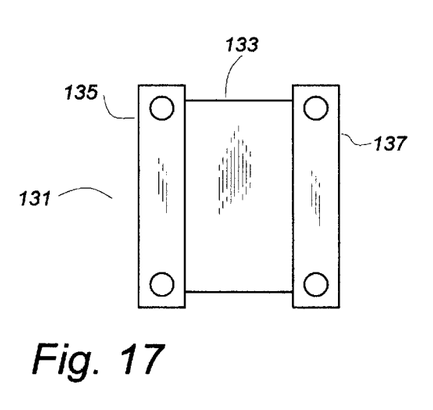

FIGS. 16 and 17 are end and top views respectively of a capacitor 131 having a capacitor element 133 to which very heavy conductors 135 and 137 have been bonded to the metalized terminations of the electrodes of the capacitor element 133. The very heavy conductors 135 and 137 can be made arbitrarily large, to carry any arbitrarily large DC currents, as shown in the schematic diagram of FIG. 14.

In a switched mode power supply, it is common to use capacitors as shunts for high frequency noise on the output bus. Often a large number of capacitors is used in an attempt to reduce the net shunt impedance. Unfortunately, no amount of lead length, no matter how short, is acceptable at higher frequencies. Some three- and four-terminal capacitors are available, as are a number of "feed through" capacitors, but these tend to have limited current carrying capacity.

This invention teaches that the output bus bars of a power supply should be intimately integrated into the capacitor and that capacitor element must have a very low ESL.

Figure 18:
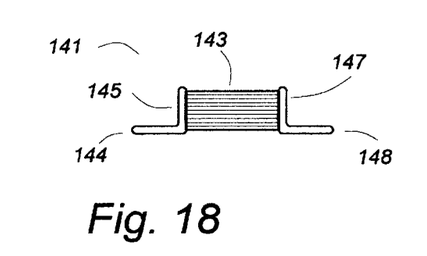
FIGS. 18 and 19 show a four-terminal capacitor having stamped metal conductors.
Figure 19:
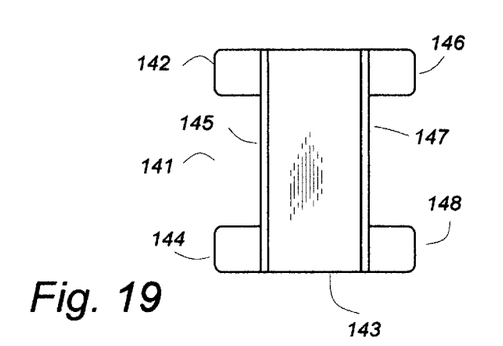

FIGS. 18 and 19 show another capacitor 141 having a capacitor element 143 to which conductors and mounting means 145 and 147 have been bonded to the metalized terminations of the electrodes of the capacitor element 143. This might be used with surface mounting techniques, with pads 142, 144, 146 and 148 providing the connections to the circuit in which the capacitor 141 is used.

Figure 20:
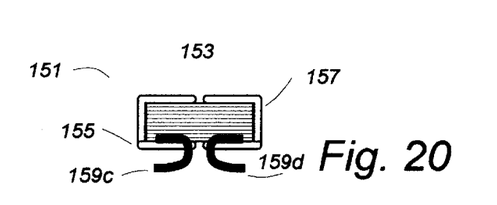
FIGS. 20 and 21 show a four terminal capacitor having folded stamped metal conductors which may partly or completely surround the capacitor element.
Figure 21:
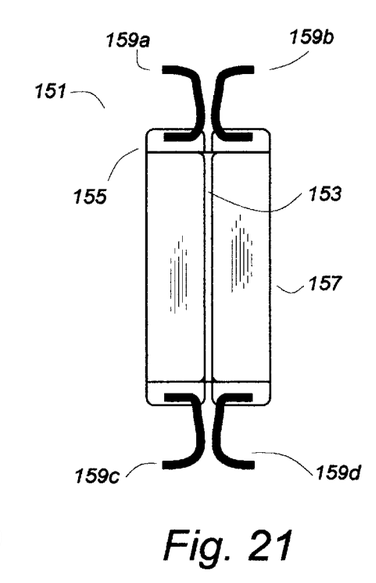

FIGS. 20 and 21 show another capacitor 151 having a capacitor element 153 to which conductors 155 and 157 have been bonded to the metalized surfaces. The conductors nearly surround the capacitor element 153, and indeed could surround it if they overlapped and insulation was provided within the overlap. This is a simple and compact way of providing very high DC current carying capability in a four terminal capacitor. The bottom of the conductors 155 and 157 could be surface mounted, or wires 159a–d,clamps, lugs, terminals or whatever could be connected to them, as illustrations, not limitations. Any usual method of completing an electric circuit could be employed to terminate such a capacitor, as is well known in the art.

Figure 22:
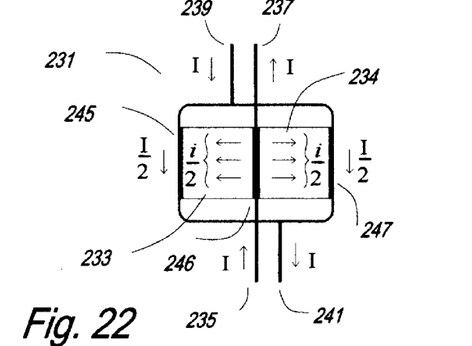
FIG. 22 shows the AC (i) and DC (I) current flow in a capacitor having two capacitor elements.

FIG. 22 shows a schematic diagram 231 which would apply to some of the capacitors described in further detail below. A DC current I can pass lengthwise through central conductor 246. The return DC current I divides and flows half on each side through peripheral conductors 245 and 247. The AC current i divides and half flows in opposite directions through capacitor elements 233 and 234. This cancels the far field and reduces the parasitic inductance. Further, the two AC currents, being equal and opposite, would generate oppositely phased fluxes which would tend to cancel each other, reducing the likelihood of inducing significant AC voltages in other loops.

Figure 23:
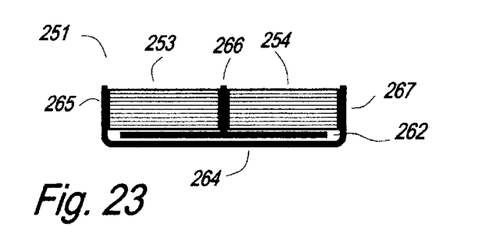
FIGS. 23 and 24 show a four-terminal capacitor comprising an assembly of stacked film capacitor elements.
Figure 24:
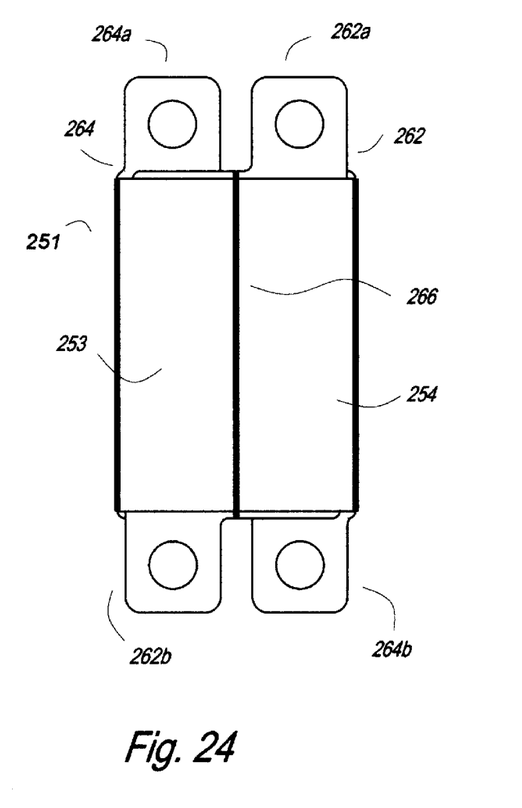

FIGS. 23 and 24 show a capacitor 251 comprising stick capacitors 253 and 254 each of which are bonded on one end to a perpendicular extension 266 of a broad conductor 262, and are bonded on the other end to perpendicular extensions 265 and 267 of a broad bottom conductor 264 shaped as a shallow "U". The capacitor 251 may be terminated in four terminals 262a, 262b, 264a and 264b, with connection to an external circuit using any method known to the art.

Figure 25:
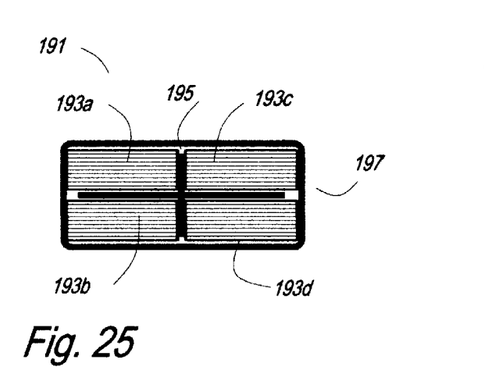
FIG. 25 shows another four-terminal capacitor comprising an assembly of stacked film capacitor elements.

The capacitor 191 of FIG. 25 uses four stick capacitor elements 193a, b, c and d. One end of each stick capacitor 193a, b, c and d is terminated on a central conductor 195, and the other end of each stick capacitor 193a, b, c and d is terminated on a peripheral conductor 197. The peripheral conductor 197 is a shield for any stray flux within it.

Figure 26:
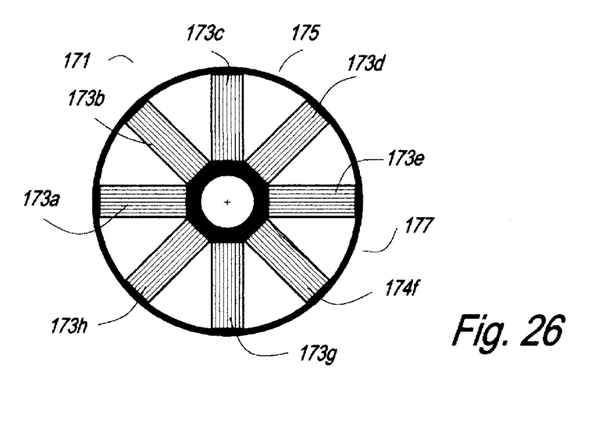
FIG. 26 shows a four-terminal capacitor comprising a radial assembly of stacked film capacitor elements.

FIG. 26 shows that a plurality of stick capacitors 173a, b, c–h could be soldered to a central conductor 175 and terminated on a peripheral ring 177 to make a tubular capacitor 171. This capacitor would have some of the characteristics of a discoidal capacitor, but would have a large capacitance and the capability of carrying very large DC currents through lengths of the central conductor 175 and the peripheral ring 173. Thus it could serve as a feed through capacitor or a four terminal capacitor.

Figure 27:
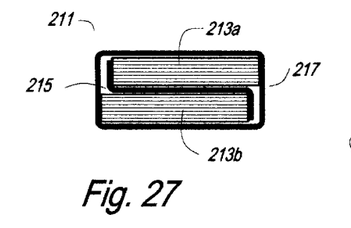
FIGS. 27 and 28 show another four-terminal capacitor comprising an assembly of stacked film capacitor elements.
Figure 28:
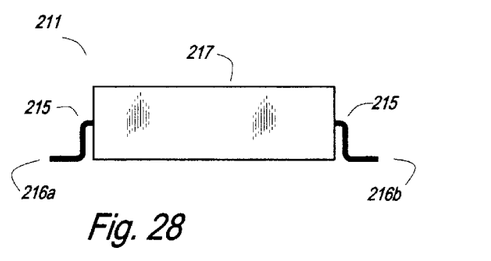

FIGS. 27 and 28 show a capacitor 211 comprising two stick capacitor elements 213a and 213b. One end of each stick capacitor 213a and b is bonded to a central conductor 215 and the other end is bonded to a peripheral conductor 217. If used as a four terminal capacitor, the DC currents would flow lengthwise while the AC currents would divide and flow in opposite directions transversely, providing a a degree of cancellation of the induced fields from the AC currents.

The schematic diagram 231 of FIG. 22 can also be applied to the capacitor 211 of FIGS. 27 and 28 if the capacitor elements 233 and 234 of FIG. 22 are envisioned as being displaced so as to overlap.

Figure 29:
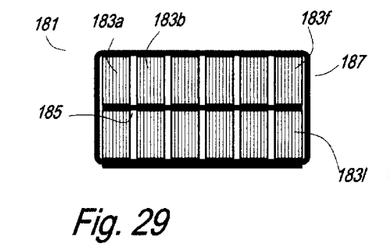
FIGS. 29 and 30 show another four-terminal capacitor comprising an assembly of stacked film capacitor elements.
Figure 30:
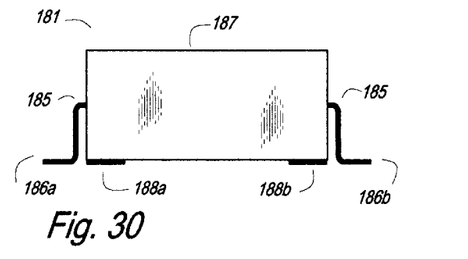

An alternative construction is shown ins FIGS. 29 and 30, respectively an end section view and a side view of a capacitor 181. A plurality of stick capacitors 183a, b, c–l are bonded on one end to a central through conductor 185 and on the other end to a peripheral conductor 187. The manner in which the capacitor 181 is terminated is arbitrary, any termination being suitable as is well known in the art. As shown, the capacitor 181 may be surface mounted as a four terminal capacitor by connecting on the mounting surface to the ends 188a and b of the peripheral conductor 187 and the pads 186a and b of the central conductor 185, as an illustration, not a limitation. Alternatively, the central conductor 185 can have perpendicular extensions upward and downward between the capacitor elements. This will increase the surface area, and provide a degree of shielding between the capacitor elements.

Figure 31:
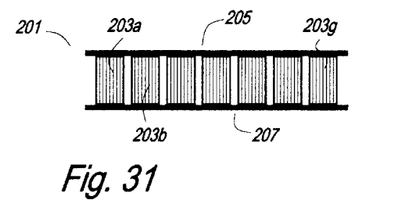
FIGS. 31 and 32 show another four-terminal capacitor comprising an assembly of stacked film capacitor elements.
Figure 32:
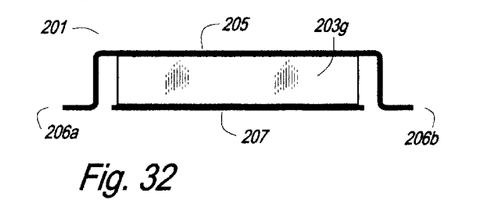

FIGS. 31 and 32 show an alternative construction in which a capacitor 201 comprises a plurality of stick capacitor elements 203a, b–e sandwiched between and bonded to a top conductor 205 and a bottom conductor 207.

Most of the above capacitors described above have been low in profile, at the expense of more "real estate". The teachings of this invention are equally applicable to upright capacitors, such as the capacitor 281 of FIGS. 33 and 34.

Figure 33:
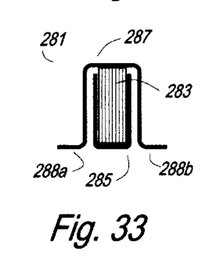
FIGS. 33 and 34 show another four-terminal capacitor comprising a stacked film capacitor element mounted vertically.
Figure 34:
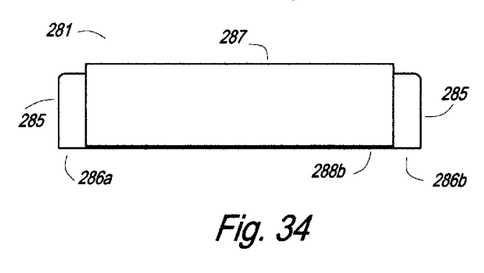

The capacitor 281 comprises a stick capacitor element 283 which is bonded on one metalized edge to an upper conductor 282 which runs the length of the capacitor 281 and is terminated in surface mounting feet 286 and 287. The other metalized edge of the stick capacitor element 283 is bonded to a bottom conductor 285 which runs the length of the capacitor 281 and extends beyond the end of the capacitor 281 to provide surface mounting areas 286a and b and 288a and b. By extending the bottom conductor 245 up the sides of the capacitor element 283, much more cross sectional area is provided, so that large DC currents could be carried in a four terminal configuration.

Figure 35:
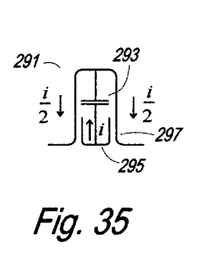
FIG. 35 shows a diagram of the current flow in the four-terminal capacitor of FIGS. 33 and 34.

FIG. 35 shows a schematic diagram of a capacitor 291 similar to the capacitor of FIGS. 33 and 34. The DC current flow is into, and out of, the plane of the drawing. The AC current flow is as shown. AC current flows from a bottom terminal 295 through the capacitor element 293, then divides and half flows downward in each side of the outer conductor 297.

Figure 36:
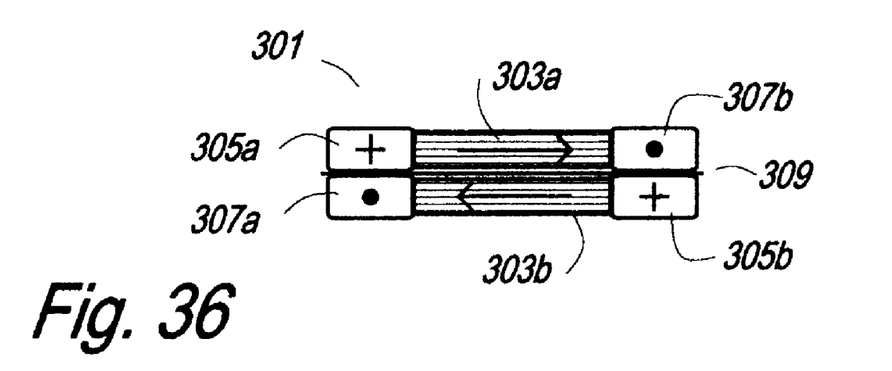
FIG. 36 shows a four terminal capacitor comprising an assembly of stacked film capacitor elements in which the DC conductors are divided for counter flowing currents.

FIG. 36 shows a capacitor 301 having two capacitor elements 303a and b one atop the other. Each has bonded to it first DC conductors 305a and b and a return DC conductor 307a and b, oppositely phased for maximum field cancellation and minimum net inductance. Arrows indicate the relative direction of the AC current flow, and dots and crosses indicate the relative direction of the DC current flow. Insulation 309 separates the parts.

Figure 37:
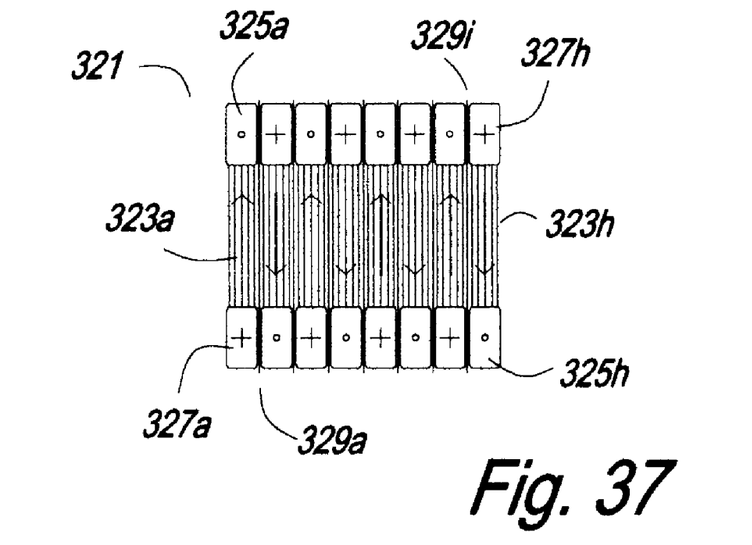
FIG. 37 shows a four terminal capacitor comprising an assembly of stacked film capacitor elements in which the DC conductors are interleaved for counter flowing currents.

FIG. 37 shows a capacitor 321 having eight capacitor elements 333a–g in a row. Each has bonded to it a first DC conductor 325a–g and a return DC conductor 327a–g, oppositely phased for maximum field cancellation and minimum net inductance. Arrows indicate the relative direction of the AC current flow, and dots and crosses indicate the relative direction of the DC current flow. Insulation 329a–i separates the parts.

Although it is not widely recognized, heat dissipation and the resulting temperature rise can limit the current carying capacity of a capacitor. Usually, the most vulnerable area is the region where the many capacitor electrodes are terminated in the metalized edges of the capacitor. (There may also be dielectric losses, if the dielectric is lossy, but this would be less related to the current carrying capacity of the capacitor.) All of the termination schemes described above provide excellent thermal conduction away from the critical areas of the capacitors, because, in general, the required direction of heat flow corresponds with the required direction of DC current flow. Where very large currents are carried the resistive loss may generate significant heat. Any of the capacitors of this invention could be mounted on a heat sink with insulation as required of the same type as is often used with semiconductors.

In many of the capacitors above, any AC flux generated by the AC currents impinges normal to the DC conductors, as taught by this invention, so that it cannot induce a voltage into the DC circuit, and its energy will be dissipated as eddy currents. Note in particular that in the capacitor 281 of FIGS. 33 and 34, there is an effective double shielded, as any flux generated by the AC current will impinge normal to the surface of the bottom conductor 285 on the portions that extend up the sides. If any flux should penetrate, it is fuirther shielded by the downward extensions of the upper capacitor.

In the above, "stick capacitor" is used generically, as an illustration, not a limitation, for any capacitor element which generally has metalized terminations of the electrodes on opposite surfaces. It is true that "stick capacitors" have characteristics which make them particularly convenient for the practice of the invention, but a wide variety of other constructions and materials could be used very effectively. Other capacitors can be manufactured in a similar geometry, or the similar geometry could be simulated. For example, it is well known to make a tubular capacitor, then flatten it to an oval. Similarly, as an illustration not a limitation, a very large diameter tubular capacitor with a very large central hole could be flattened to approximate a stick capacitor. Also, a row of smaller capacitors may be used to produce the same effect. For example, as an illustration not a limitation, a row of small ceramic capacitors may be used, and this construction may be desirable to mitigate problems of thermal expansion. As used in this specification and the claims, the term "stick capacitor" includes these and any other equivalent or similar construction.

As used in this specification and the claims, "bond", "bonding" and "bond" are used generically, as an illustration, not a limitation, for any method of effecting an electrical connection and/or a mechanical connection. In many cases, soldering would be preferred, but welding, clamping, entrapment, wedging, strapping, or any other means of making a connection as is known to the art could be used. So long as an effective electrical connection or a mechanical connection is effected, the "bond" may be made through one or more intermediate layer, structure, material or whatever so long as the intended purpose of making an electrical circuit and/or a mechanical structure is achieved.

I claim:

1. A four-terminal capacitor package comprising at least a first stick capacitor having a first electrode, a second electrode, a dielectric separating the first electrode from the second electrode, a first metallized surface which is a termination of the first electrode, a second metallized surface which is opposite the first metallized surface and which is a termination of the second electrode, a height, defined as the dimension between the first metallized surface and the second metallized surface, a thickness defined as the perpendicular dimension through the first electrode, the second elctrode and the dielectric, a length defined as the dimension perpendicular to the height and the thickness, the length being large relative to the height and the thickness, a first heavy conductor means bonded to the first metallized surface of the at least a first stick capacitor, a second heavy conductor means bonded to the second metallized surface of the at least a first stick capacitor, the first and second heavy conductor means each having a cross sectional area sufficient to carry a large current, a first terminal at a first end of the first heavy conductor means, a second terminal at a second end of the first heavy conductor means, a third terminal at a first end of the seco nd heavy conductor means, and a fourth terminal at a second end of the second heavy conductor means, whereby;

the first heavy conductor means has a capacity to conduct a first large current between the first terminal and the second terminal, the second heavy conductor means has a capacity to conduct a second large current between the fourth terminal and the third terminal, and the at least a first stick capacitor provides a very low impedance path for AC currents between the first heavy conductor means and the second heavy conductor means.

2. The four-terminal capacitor package of claim 1 in which the terminals are holes near respective ends of the respective heavy conductor means.

3. The four-terminal capacitor package of claim 2 in which the holes are tapped holes.

4. The four-terminal capacitor package of claim 1 in which the terminals are surface mount pads near the respective ends of the respective heavy conductor means.

5. The four-terminal capacitor package of claim 1 in which the terminals are wires attached near respective ends of the respective heavy conductor means.

6. The four-terminal capacitor package of claim 1 wherein the first heavy conductor means and the terminals provide thermal paths for heat-sinking for the at least one stick capacitor.

7. A four-terminal capacitor package comprising a plurality of stick capacitors, having a first electrode, a second electrode, a dielectric separating the first electrode from the second electrode, a first metallized surface which is a termination of the first electrode, a second metallized surface which is opposite the first metallized surface and which is a termination of the second electrode, a height, defined as the dimension between the first metallized surface and the second metallized surface, a thickness defined as the perpendicular dimension through the first electrode, the second electrode and the dielectric, a length defined as the dimension perpendicular to the height and the thickness, the length being large relative to the height and the thickness, a first heavy conductor means bonded to the first metallized surface of each of the plurality of stick capacitors, a second heavy conductor means bonded to the second metallized surface of each of the plurality of stick capacitors, the first and second heavy conductor means each having a cross sectional area sufficient to carry a large current, a first terminal at a first end of the first heavy conductor means, a second terminal at a second end of the first heavy conductor means, a third terminal at a first end of the second heavy conductor means, and a fourth terminal at a second end of the second heavy conductor means, whereby, the first heavy conductor means has a capacity to conduct a first large current between the first terminal and the second terminal, the second heavy conductor means has a capacity to conduct a second large current between the fourth terminal and the third terminal, and the plurality of stick capacitors provides a very low impedance path for AC currents between the first heavy conductor means and the second heavy conductor means.

8. The four-terminal capacitor package of claim 7 in which the plurality of stick capacitors are arranged and disposed as at least a first pair of stick capacitors in which the AC current flows in opposite direction so that any flux generated therein tends to be canceled.

9. The four-terminal capacitor package of claim 7 in which the first heavy conductor means is centrally located and in which the second heavy conductor means is peripherally located.

10. The four-terminal capacitor package of claim 7 wherein the first heavy conductor means and the terminals provide thermal paths for heat-sinking the plurality of stick capacitors.

11. A four-terminal capacitor package comprising a plurality of stick capacitors, having a first electrode, a second electrode, a dielectric separating the first electrode from the second electrode, a first metallized surface which is a termination of the first electrode, a second metallized surface which is opposite the first metallized surface and which is a termination of the second electrode, a height, defined as the dimension between the first metallized surface and the second metallized surface, a thickness defined as the perpendicular dimension through the first electrode, the second electrode and the dielectric, a length defined as the dimension perpendicular to the height and the thickness, the length being large relative to the height and the thickness, a plurality of first heavy conductor means, each of the plurality of first heavy conductor means bonded to the first metallized surface of one of the plurality of stick capacitors, a plurality of second heavy conductor means, each of the plurality of second heavy conductor means bonded to the second metallized surface of one of the plurality of stick capacitors, each one of the plurality of first heavy conductor means and each one of plurality of second heavy conductor means having a cross sectional area sufficient to carry a large current, a first termination connecting in parallel each first end of the plurality of first heavy conductor means, a second termination connecting in parallel each second end of the plurality of the first heavy conductor means, a third termination connecting in parallel each first end of the plurality of second heavy conductor means, and a fourth termination connecting in parallel each second end of the plurality of the second heavy conductor means, whereby, the plurality of first heavy conductor means has a capacity to conduct a first large current between the first termination and the second termination, the plurality of second heavy conductor means has a capacity to conduct a second large current between the fourth termination and the third termination, and the plurality of stick capacitors provides a very low impedance path for AC currents between the plurality of first heavy conductor means and the plurality of second heavy conductor means.

12. The four-terminal capacitor package of claim 11 in which the plurality of first heavy conductor means are arranged and disposed relative to the plurality of second heavy conductor means so that equal counter-flowing currents are paired respectively therein.

13. The four-terminal capacitor package of claim 11 wherein the first plurality of heavy conductor means and the terminations provide thermal paths for heat-sinking the plurality of stick capacitors.

\* \* \* \* \*